US007465371B2

(12) United States Patent
Bachmann

(10) Patent No.: US 7,465,371 B2
(45) Date of Patent: Dec. 16, 2008

(54) HOT PRESSING APPARATUS WITH A PRESSURE PLATE AND AT LEAST ONE RESILIENT LINING

(75) Inventor: Wolfgang Bachmann, Rodermark (DE)

(73) Assignee: Bachmann Kunststoff Technologien GmbH, Rodermark (DE)

( * ) Notice: Subject to any disclaimer, the term of this patent is extended or adjusted under 35 U.S.C. 154(b) by 0 days.

(21) Appl. No.: 10/984,375

(22) Filed: Nov. 9, 2004

(65) Prior Publication Data

US 2005/0112384 A1 May 26, 2005

(30) Foreign Application Priority Data

Nov. 12, 2003 (DE) ................................ 103 52 754

(51) Int. Cl.
*B32B 37/00* (2006.01)

(52) U.S. Cl. ................................ 156/583.3; 156/583.1

(58) Field of Classification Search ................. 156/228, 156/580, 581, 583.1, 583.3, 583.4; 100/295; 442/229

See application file for complete search history.

(56) References Cited

U.S. PATENT DOCUMENTS 4,529,472 A * 7/1985 Hsu ........................... 156/498
5,120,597 A * 6/1992 Takimoto et al. ............ 442/136
5,298,322 A * 3/1994 Hennecken et al. ......... 442/229
5,562,796 A * 10/1996 Ertel .......................... 156/498
5,589,026 A * 12/1996 Perecman ................... 156/286
5,599,566 A * 2/1997 Casolari .................. 425/405.1
5,855,733 A * 1/1999 Douglas et al. .......... 156/583.1
6,250,217 B1 * 6/2001 Korybutiak ................. 100/326
6,413,889 B1 * 7/2002 Best et al. .................... 442/305
6,645,347 B2 * 11/2003 Stein et al. ............... 156/583.3
6,752,901 B2 * 6/2004 Musse ...................... 156/583.3
6,780,280 B2 * 8/2004 Halterbeck et al. ....... 156/583.3
2001/0015264 A1 * 8/2001 Stein et al. .................. 156/581

OTHER PUBLICATIONS

Rompp Chemie Lexikon, Falbe, et al. (1995).

* cited by examiner

*Primary Examiner*—James Sells
(74) *Attorney, Agent, or Firm*—Fulbright & Jaworski L.L.P.

(57) ABSTRACT

A pressing apparatus having a pressure plate (6) for the hot pressing of materials (5) of the following group: laminates, wood materials, wood-plastic materials, chip and flake boards, wood, paper, film and pulp combinations for floors, walls and ceilings, has at least one heated platen (3), and at least one resilient lining (10) is situated between the platen (3) and the pressure plate (6). In order to achieve short cycling time, uniform pressing action, high and uniform thermal gradients, avoidance of air inclusions and cold spots, and long useful life, with low numbers of rejects, the following solution is proposed:

a) The pressure plate (6) has on the side facing the platen (3) at least one lining (10) firmly adhering to the pressure plate (6) and made of a thermally conductive, resilient plastic, and
b) the pressure plate (6) is in contact with its lining (10) against the platen without any air gap.

With it, material up to a size of 6 m×9 m and over can be hot-pressed perfectly.

22 Claims, 4 Drawing Sheets

FIG. 2
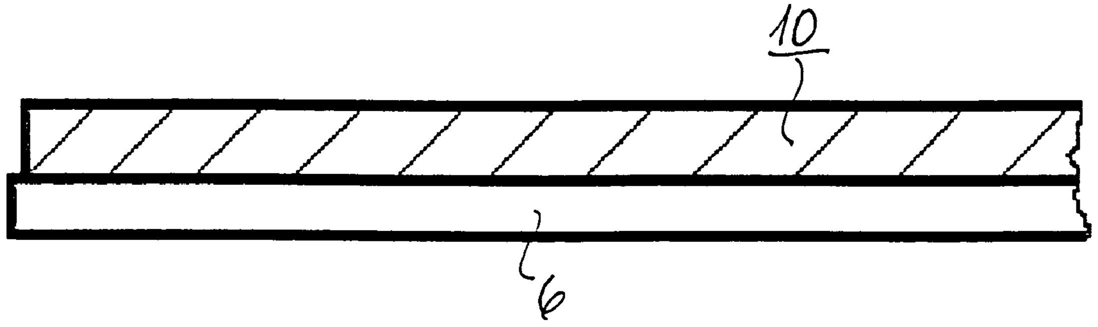
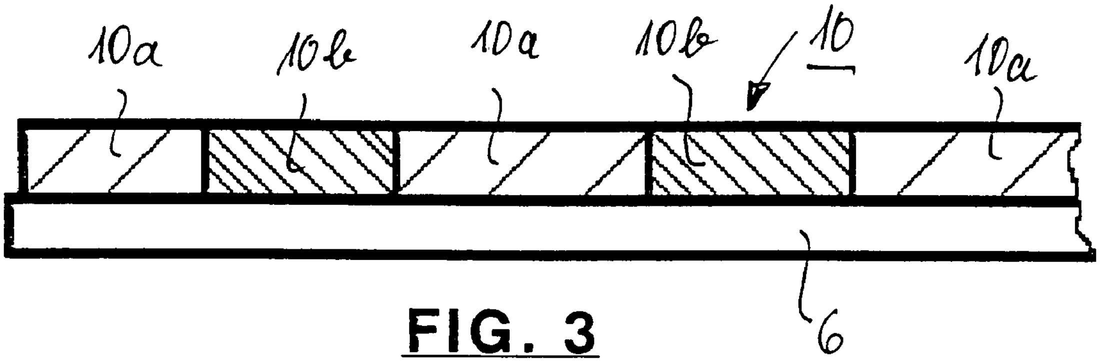
FIG. 3
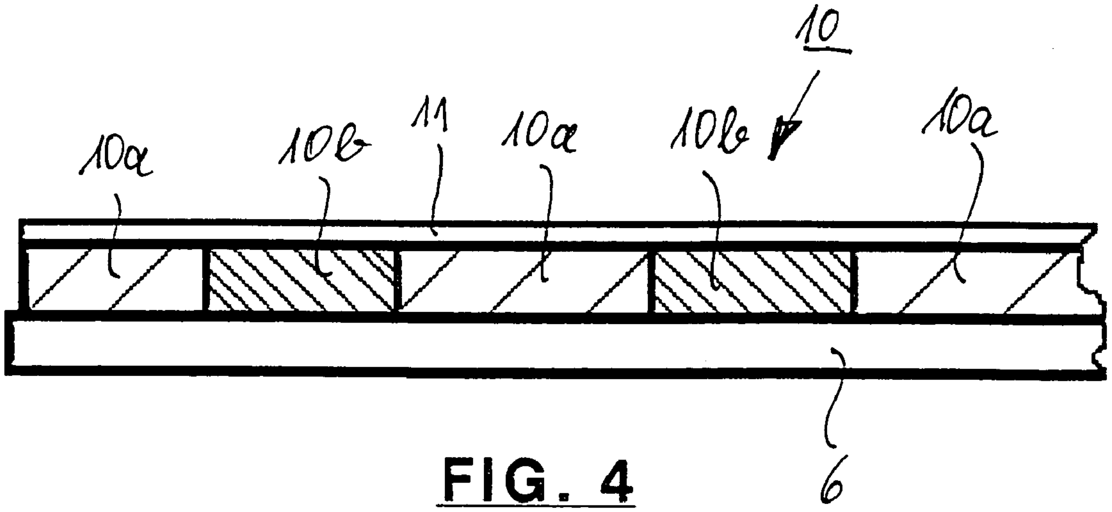
FIG. 4

HOT PRESSING APPARATUS WITH A PRESSURE PLATE AND AT LEAST ONE RESILIENT LINING

This application claims priority under 35 U.S.C. § 119 from German patent application DE 103 52 754.0-14 filed Nov. 12, 2003, hereby incorporated by reference in its entirety.

BACKGROUND AND SUMMARY OF THE INVENTION

The invention relates to a pressing apparatus with a pressure plate for the hot pressing of materials from the group of the laminates, wood materials, wood/plastic materials, chip and flake boards, and wood, paper, film and pulp board combinations for floors, walls and ceilings, the pressing apparatus having at least one heated press platen, and wherein at least one resilient lining is arranged between the platen and the pressure plate.

In heated pressing apparatus of this kind, which may be parts of a single or multiple platen press, in order to achieve short cycling times and uniform pressing action the important thing is to provide for the greatest and most uniform heat transfer and an extremely uniform distribution of high pressing forces over the entire material. At the same time it must be remembered that the dimensions of the material may be 6 m×9 m and more.

Negative examples of poor heat transfer are double glazing for windows and Thermos vacuum vessels.

In the field to which the state of the art and the invention belong, the industry distinguishes between press pads and coated press plates.

Press Pads:

DE 26 27 442 A1 discloses a press pad for hot plate pressing, in which a cloth made of random fiber fleece is coated on both sides with silicone rubber.

EP 0 920 982 A1 discloses a press pad made from a fabric of crossed threads is disclosed, the core of which is, for example, a thread of a silicone elastomer with a Shore A hardness of 60 to 75 which is wrapped by at least one metal wire. The metal wires can be electrical heating resistances. But air inclusions between the fabric and the material being pressed are not excluded.

EP 1 040 909 A1 discloses providing an inherently resilient press pad with outer layers on both sides, which are joined together by a plurality of spacing threads. To improve heat transfer, at least some of the spacing threads consist of metal wires. However, these fall far short of compensating for the insulating action of the enclosed air cushion.

DE 200 11 432 U1 discloses, in the case of a press pad, the embedding of a textile fabric of polyamide and metal threads in a continuous layer of a polymer material resistant to heat and pressure.

It is furthermore disclosed by DE 100 34 374 A1, for the manufacture of a thermally conductive press pad with a maximum thickness of 2.2 mm and without air inclusions, to coat a metal fabric on both sides from the upper side with a silicone mass containing metal powder with a crosslinking agent, and to cure this press pad.

DE 200 13 422 U1 discloses a press pad of intersecting threads or bundles of threads, of which at least a portion have magnetic properties for fixation to a heating plate. Nothing is said about any elimination of insulating air inclusions.

A press pad is disclosed by DE 201 15 945 U1 in which thermally conductive filaments are partially embedded in a mass of rubber-resilient material and protrude from both outer sides of the press pad. In that case the air masses between the protruding metal filaments and the thermal conductivity of the metal filaments are diametrically opposed. Even if in the course of the very limited time of operation the metal filaments become incorporated into the resilient material, another problem arises, namely the inability of air trapped between the press lining and the platen to escape.

To enable the press to be opened, such short-lived press pads must be suspended from the platen, so that they sag down in the middle like hammocks, even if they do not contain magnetic material—as in the case, for example, of the subject matter of DE 200 13 422 U1—and even if the platen also consists of a magnetic material such as steel. Thus, however, the problem again increases that air inclusions between the press pads and the platen cannot escape at all or only slowly, and this problem increases with increasing smoothness of the surface which the platen is facing. In other words, here again the necessary hot contact and the air inclusions are diametrically opposed.

Coated Pressure Plates:

In practice, pressure plates are the plain metal sheets or metal plates, which consequently can also be called carrier plates because they have a carrying function for applied linings and linings of one or more components.

DE 39 11 958 A1 has disclosed a pressure plate for the cold pressing of mineral materials, in which at least one external layer of an ultra-high molecular weight thermoplastic, such as polyethylene, is applied to a light-metal plate as a pressure plate. Such a lining is hard. In this case, however, thermal transfer plays no part in the pressing of the material, the resilientity likewise plays no part in the leveling out of irregularities in the surface of the material being pressed.

DE 40 05 157 C1 has disclosed a pressure plate for the hot pressing of materials, for the production of very smooth surfaces on the material being pressed, wherein a corrosion-resistant and scratch resistant glass lining, which likewise is non-resilient in itself, is applied to the pressure plate. In this case again, the resilientity plays no part in the equalization of irregularities in the surface of the material being pressed.

In DE 42 09 670 C1, pressure plates are disclosed for a hot press for a material (decorative laminae with a textured surface) with a maximum thickness of 1.2 mm, wherein padding layers are arranged between the pressure plates and the platens. However, no information is given on their properties, particularly not about what materials the padding layers are made of, and whether they are free of air inclusions. The solution of a different problem is involved, namely the use of removable masks to shield surface areas not used in the pressing process against damage and contamination.

It is therefore the purpose of the invention to offer a coated pressure plate of the kind described in the beginning for hot presses, whereby brief cycle times and uniform and full surface press actions are achieved by the avoidance of air inclusions and cold spots, as well as an extremely uniform distribution of high pressing forces across the entire material, and long useful life and low product rejects are achieved, especially in the case of raw material dimensions of up to 6 m×9 m and over.

The solution of the stated problem is achieved by the invention, in the case of the pressure plate referred to in the beginning, by the fact that a) the pressure plate has on the side facing the platen at least one lining of a thermally conductive, resilient plastic firmly adhering to the pressure plate, and that b) the lining of the pressure plate is in contact free of air gaps with the platen.

With these features the stated problem is solved to the full extent. Short cycle times and uniform, full-surface press actions are achieved by avoiding air inclusions and cold spots, and with an extremely uniform distribution of high pressing forces over the entire material, with long production runs and few product rejects. This is especially true for raw material dimensions up to 6 m×9 m and over. Any increase in the usual working temperature of the platen of, for example about 200° C. can be prevented by avoiding air inclusions, thereby also preventing unnecessary heat losses.

As a result of further embodiments of the invention it is especially advantageous if, either singly or in combination:

- the resilient lining has a Shore-A hardness between 40 and 80, especially between 50 and 70, and preferably of about 60,
- the resilient lining consists of a silicone material,
- the resilient lining is bonded to the pressure plate by an adhesive,
- the resilient lining is provided with metal embedments in particle form,
- the resilient lining has a thickness of 1 to 4 mm,
- the resilient lining is divided into areas of different Shore A hardness,
- the resilient lining has the relatively greatest Shore-A hardness at the marginal areas of the pressure plate,
- the pressure plate has a thickness between 2 and 8 mm, preferably between 3 and 5 mm,
- the pressure plate consists of at least one metal from the group: stainless steel, copper and brass,
- the resilient lining of the pressure plate on the side facing the platen is provided with a layer of a soft metal,
- the metallic layer consists of sheet copper and has a thickness between 0.3 and 0.4 mm,
- the metallic layer consists of a fine metal mesh embedded in the resilient lining,
- on the side facing the platen the pressure plate has an alternating series of layers of at least two resilient layers and at least two layers of soft metal from the group of the metal foils and metal meshes,
- the overall structure of the coated pressure plate and of the platen is free of air inclusions,
- the overall structure of the coated pressure plate is made at least largely self-supporting,
- the overall structure of the coated pressure plate is fastened by at least one screw penetrating the pressure plate on the bottom of the platen, and/or, if
- the overall structure of the coated pressure plate is fastened to the circumferential edge of the platen.

The application of the resilient lining can be performed either by uniform brushing, extrusion from a slit nozzle, or it can be done by pouring an initially free-flowing composition from one or more nozzles in a predetermined very narrow and uniform distribution pattern onto the pressure plate, in which case the initially free-flowing composition spreads out at least largely by itself, and then the composition can be let stand until it reaches the predetermined Shore-A hardness; silicone resins are especially well suited for this purpose.

Examples of the embodiment of the subject of the invention and its ways of operation are further explained below with the aid of FIGS. 1 to 7, which are highly schematized and not necessary to scale.

BRIEF DESCRIPTION OF THE FIGURES

FIG. 4 the subject matter of FIG. 3 with an additional layer of a metal, FIG. 5 a corner of a pressure plate with an resilient lining as in FIG. 2, onto which a layer of a soft metal foil is applied, which is partially removed for clarity, FIG. 6 a corner of a pressure plate according to FIG. 3 in a plan view, and FIG. 7 a vertical section taken through a pressure plate with a lining which is composed of resilient and soft metal layers in alternation.

DETAILED DESCRIPTION

Figure 1:
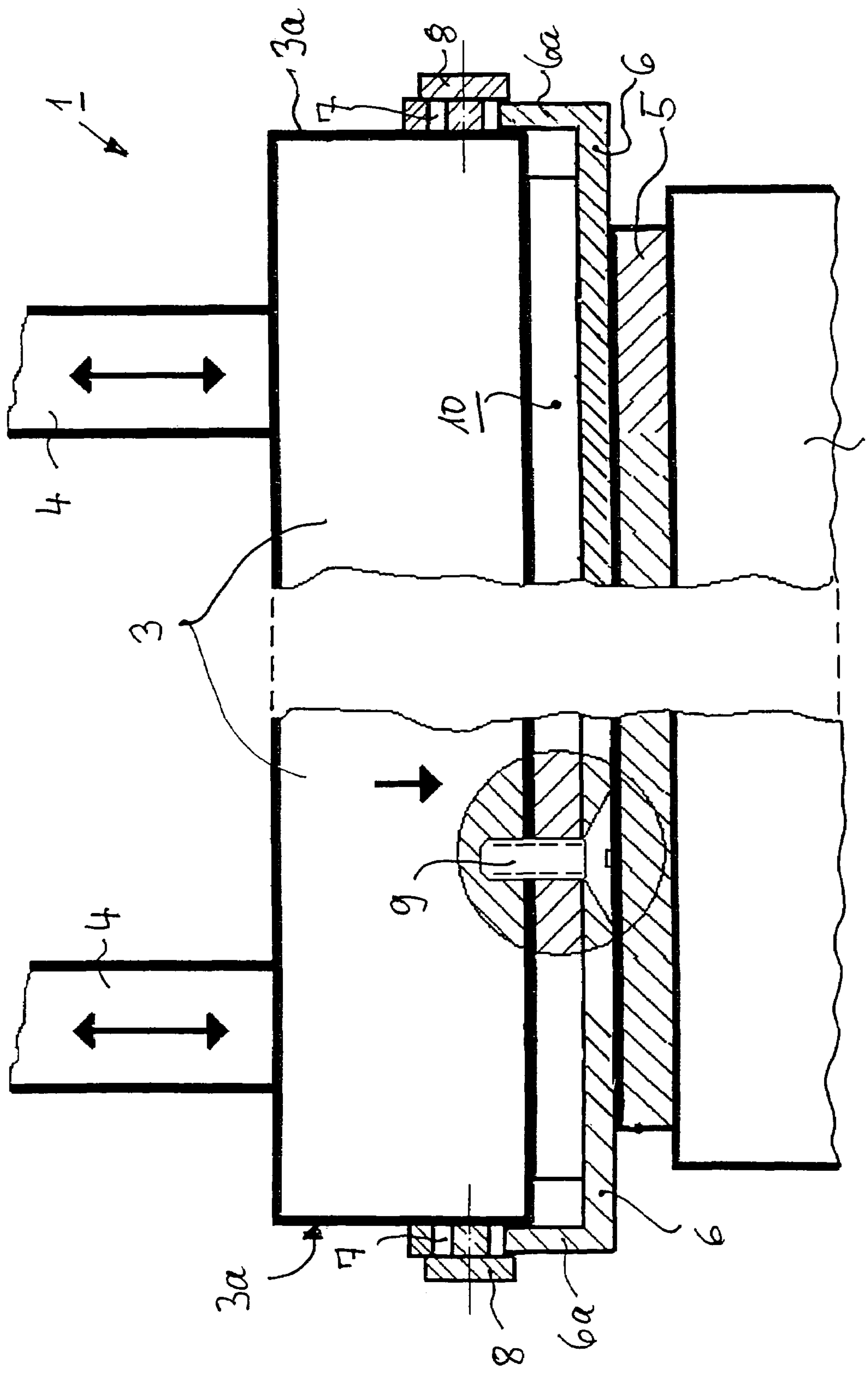
FIG. 1 is a vertical section taken through the essential parts of a press apparatus showing the material being pressed, the pressure plate, platen and resilient lining, FIG. 2 a vertical section taken through a pressure plate with a single resilient lining, FIG. 3 a vertical section taken through a pressure plate with an resilient lining which has zones or areas of different Shore-A hardness.

In FIG. 1 there is shown a section of a pressing machine 1 which has a bottom part 2, also called the machine table, and an platen 3, also called the machine's upper part, which can be driven in the vertical direction by a plurality of synchronously operating driving elements 4, the driving elements being able to be in the form of hydraulic or pneumatic cylinders, but also in the form of mechanical driving means such as spindle drives. The usual press frame surrounding these components has been omitted from the drawing for simplicity. Since an apparatus for the hot pressing of material 5 is involved, the machine's bottom part 2 and platen 3 are provided with heating devices. These press components and their operation are known and therefore are not further described.

With the press apparatus 1 the material 5 can be solidified in itself, provided with a superficial decorative lining and/or provided with a surface texture such as a wood grain.

A pressure plate 6 of metal is suspended on the platen 3, namely fastened at upturned portions 6*a* with perpendicular slots 7 and with horizontal screws 8 to the circumferential margin 3*a* of the platen 3 and/or by perpendicular flat-head screws 9 which do not protrude downwardly from the pressure plate 6. Of decisive importance is the interposition of an inherently resilient lining 10 which can be formed either in one layer or in multiple layers in the vertical direction, or which can also have, in the horizontal direction, zones or areas of different Shore-A hardness. This will be further dealt with in connection with additional figures.

Preferably, the resilient lining components can be those with Shore-A hardness between 40 and 80, still better those with Shore-A hardness between 50 and 70, and especially those with Shore-A hardness of about 60. Non-dimensional units are involved, per DIN 53 505. Very suitable are silicones and silicone materials. See RÖMMP CHEMIE LEXIKON, 1995 edition, page 4137 and pages 4168 to 4172.

Especially important is the perfect flatness of the pressure plate 6, and of the lining 10, the avoidance of air inclusions both within the lining 10 and between this lining 10 and the platen on the one hand and the material being pressed 5 on the other hand. Also important is good heat conductivity from the platen to the pressure plate 6. On the one hand the resilientity of the lining 10 must be sufficiently high on the one hand, but on the other hand so must the thermal conductivity, which can be improved by embedding particles, meshes or screens of metal.

For the thickness of the resilient lining 10 and the sum of all layers composing the lining 10, a range between 1 and 4 mm is involved. For the thickness of the pressure plate 6 a range between 2 and 8 mm, preferably between 3 and 5 mm. The bonding of the lining 10 to the pressure plate 6 can be improved, preferably by an adhesive. Such adhesives are, in themselves, known and commercially available. See RÖMMP CHEMIE LEXIKON, 1995 edition, pages 1703 and 1704.

FIG. 2 shows a vertical section taken through a pressure plate 6 with a single, one-layer resilient lining 10. FIG. 3 shows a vertical section taken through a pressure plate 6 with an resilient lining 10 which has zones or areas 10*a* and 10*b* of different Shore-A hardness, the area 10*a* with the greater Shore-A hardness extends mainly over the entire circumferential area of the pressure plate 6. FIG. 4 shows the subject of FIG. 3 with an additional layer 11 of metal, e.g., a soft metal foil.

Figure 5:
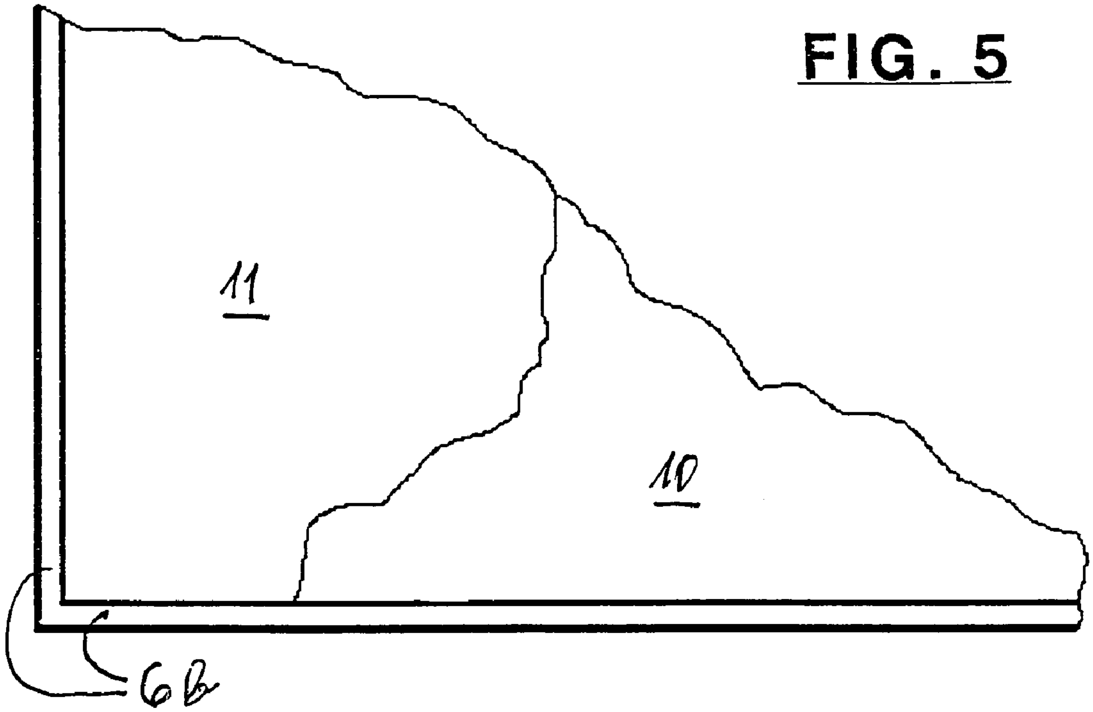
Figure 6:
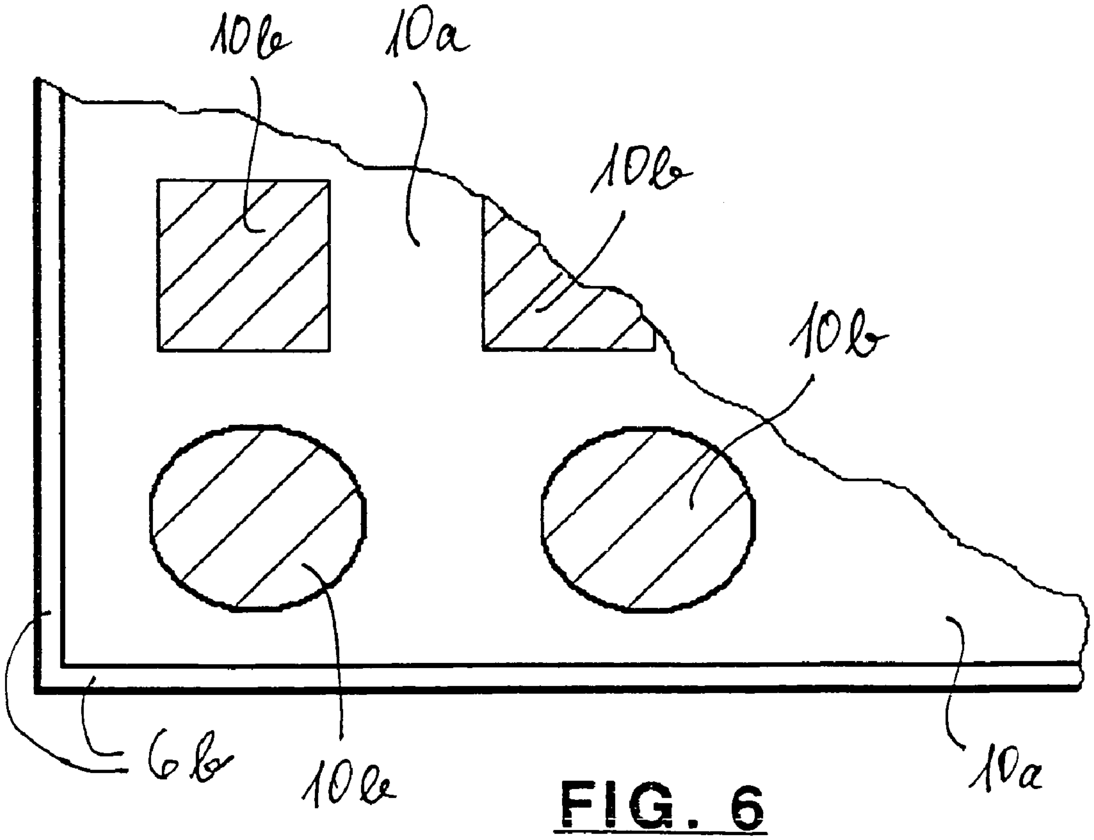

FIG. 5 shows one corner projecting from the edge 6*b* of a pressure plate 6 with an resilient lining 10 according to FIG. 2, onto which a layer 11 of a soft metal foil is placed, which has been partially removed for greater clarity. FIG. 6 shows in plan a corner of a pressure plate 6 according to FIG. 3, with zones or areas 10*a* and 10*b* of different Shore-A hardness. This layering permits an evening out of different surface geometries of the material being pressed 5 (FIG. 1). With the subject of the invention it is possible to exert equal pressure forces at equal temperatures with every surface element of the lining.

Figure 7:
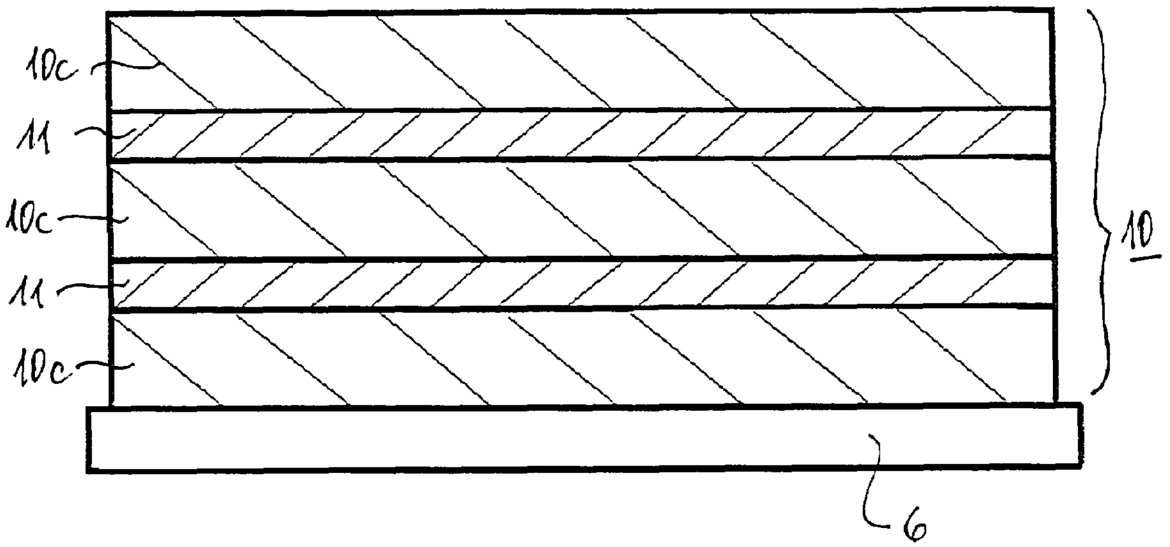

FIG. 7 shows a vertical section taken through the pressure plate 6 with a lining 10 which is composed alternately of three resilient layers 10*c* and two soft metal layers 11 which consist, for example, of sheet copper and/or a copper mesh with a thickness of 0.3 to 0.4 mm.

It is claimed:

1. A pressing apparatus for the hot pressing of a material selected from the group consisting of a laminate, a wood material, a wood-plastic material, a chip and flake board, wood, paper, film and a pulp board combination for floors, walls and ceilings comprising:

- a bottom platen and an upper platen, wherein both the bottom platen and the upper platen have heating devices;
- a metallic pressure plate for hot pressing the material, said metallic pressure plate being exchangeably attached to the upper platen; and
- a resilient lining being thermally conductive and tightly adhering to the upper side of said metallic pressure plate, facing the upper platen and lying free of an air gap against the upper platen; wherein
- an overall structure of said pressure plate is having unturned portions fastened by a plurality of horizontal screws to the circumferential margin of the upper platen, thereby including the resilient lining between the upper platen, the pressure plate and the upturned portions, creating a flatness of the pressure plate and of the resilient lining whereby the overall structure of the pressure plate is at least largely self-supporting and suspended on the platen.

2. A pressing apparatus according to claim 1, wherein the resilient lining has a Shore-A hardness between 40 and 80.

3. A pressing apparatus according to claim 2, wherein the resilient lining has a Shore-A hardness between 50 and 70.

4. A pressing apparatus according to claim 2, wherein the resilient lining has a Shore-A hardness of about 60.

5. A pressing apparatus according to claim 1, wherein the resilient lining comprises a silicone material.

6. A pressing apparatus according to claim 1, wherein the resilient lining is provided with metal embedments in particle form.

7. A pressing apparatus according to claim 1, wherein the resilient lining is bonded with an adhesive to the pressure platen.

8. A pressing apparatus according to claim 1, wherein the resilient lining has a thickness of 1 to 4 mm.

9. A. pressing apparatus according to claim 1, wherein the resilient lining has zones of different Shore-A hardness.

10. A pressing apparatus according to claim 9, wherein the resilient lining has the relatively greatest Shore-A hardness at the marginal zones of the pressure plate.

11. A pressing apparatus according to claim 1, wherein the metallic pressure plate has a thickness between 2 and 8 mm.

12. A pressing apparatus according to claim 11, wherein the metallic pressure plate has a thickness between 3 and 5 mm.

13. A pressing apparatus according to claim 1, wherein the metallic pressure plate comprises of at least one metal from the group of stainless steel, copper and brass.

14. A pressing apparatus according to claim 1, wherein the resilient lining is provided on the side facing the upper platen with a layer of a soft metal.

15. A pressing apparatus according to claim 14, wherein the layer of soft metal comprises of sheet copper and has a thickness between 0.3 and 0.4 mm.

16. A pressing apparatus according to claim 14, wherein the layer of soft metal comprises of a fine metal mesh embedded in the resilient lining.

17. A pressing apparatus according to claim 1, wherein the metallic pressure plate has on a side facing the upper platen a series of layers of at least two resilient layers and at least two layers of soft metal selected from the group consisting of a metal foil and a metal mesh.

18. A pressing apparatus according to claim 17, wherein the soft metal is a metal mesh.

19. A pressing apparatus according to claim 17, wherein the metal is a metal foil.

20. A pressing apparatus according to claim 1, wherein two horizontal screws are provided.

21. A pressing apparatus according to claim 2 wherein at least two horizontal screws are provided.

22. A pressing apparatus according to claim 1, wherein the horizontal screws penetrate the upturned portions through perpendicular slots.

* * * * *